United States Patent
Kikin-Gil et al.

(10) Patent No.: US 11,163,938 B2
(45) Date of Patent: Nov. 2, 2021

(54) PROVIDING SEMANTIC BASED DOCUMENT EDITOR

(71) Applicant: MICROSOFT TECHNOLOGY LICENSING, LLC, Redmond, WA (US)

(72) Inventors: Ruth Kikin-Gil, Redmond, WA (US); Daniel Costenaro, Bellevue, WA (US); Rebecca Seerveld, Redmond, WA (US); Wesley Hodgson, Seattle, WA (US); Robert McKaughan, Redmond, WA (US); Charles Cummins, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/133,775

(22) Filed: Sep. 18, 2018

(65) Prior Publication Data
US 2019/0018828 A1 Jan. 17, 2019

Related U.S. Application Data

(63) Continuation of application No. 14/825,069, filed on Aug. 12, 2015, now Pat. No. 10,133,715.

(51) Int. Cl.
*G06F 40/166* (2020.01)
*G06F 40/103* (2020.01)
*G06F 40/106* (2020.01)
*G06F 40/186* (2020.01)

(52) U.S. Cl.
CPC .......... *G06F 40/166* (2020.01); *G06F 40/103* (2020.01); *G06F 40/106* (2020.01); *G06F 40/186* (2020.01)

(58) Field of Classification Search
CPC ...... G06F 17/24; G06F 17/211; G06F 17/212; G06F 17/248
See application file for complete search history.

(56) References Cited

U.S. PATENT DOCUMENTS

| | | | |
|---|---|---|---|
| 2003/0004957 A1* | 1/2003 | Broman | G06F 17/24 |
| 2010/0195131 A1* | 8/2010 | Nakata | G06F 3/04842 358/1.13 |
| 2011/0153428 A1* | 6/2011 | Ramer | G06Q 30/00 705/14.64 |
| 2014/0149426 A1* | 5/2014 | Brugler | G06Q 10/10 707/748 |

OTHER PUBLICATIONS

Joan Lambert and Joyce Cox, Microsoft Word 2013 Step by Step, Jan. 15, 2013, Microsoft Press, pp. 1-276 (Year: 2013).*

* cited by examiner

*Primary Examiner* — Scott T Baderman
*Assistant Examiner* — Seung Woon Jung
(74) *Attorney, Agent, or Firm* — Rainier Patents, P.S.

(57) ABSTRACT

A semantic based document editor is provided. An application such as a document processing application displays previews of a document. The previews include semantic styles. In response to a selection of one of the previews, a semantic style associated with the selected preview is applied to a section of the document. The semantic style is rendered in the selected preview. A suggestion is displayed on the section. The suggestion identifies the section. The suggestion is also formatted based on the semantic style.

20 Claims, 7 Drawing Sheets

PROVIDING SEMANTIC BASED DOCUMENT EDITOR

CROSS-REFERENCE TO RELATED APPLICATIONS

This application claims priority to and is a continuation of co-pending U.S. patent application Ser. No. 14/825,069 entitled "Providing Semantic Based Document Editor" and filed Aug. 12, 2015, which is incorporated herein by reference.

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications present documents. Commands with operations to edit documents are also presented through a display and enable users to provide input associated with the applications' operations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a semantic based document editor. In some examples, a document processing application may display previews of a document. The previews may include semantic styles. A selection of one of the previews may be detected. A semantic style associated with the selected preview may be applied to a section of the document. The semantic style may be rendered in the selected preview. A suggestion may be displayed on the section. The suggestion may identify the section. The suggestion may be formatted based on the semantic style.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
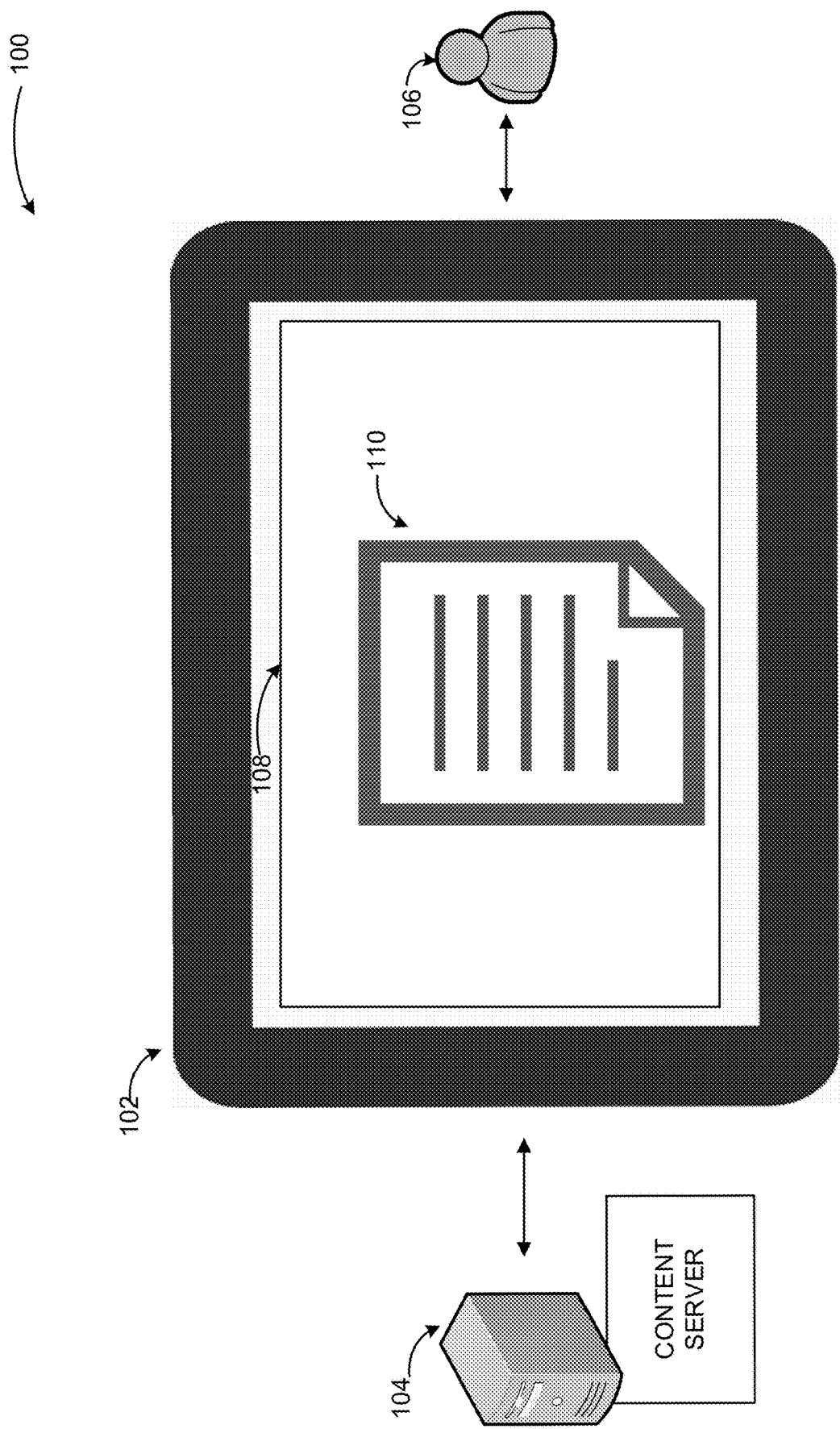
FIG. 1 is a conceptual diagram illustrating an example of providing a semantic based document editor, according to embodiments.

As briefly described above, a semantic based document editor may be provided by a document processing application. The document processing application may display previews of a document. The previews may include semantic styles. A semantic style may include a classification of a section of the document into a title, a subtitle, a heading, a bullet list, or a paragraph, among others. A selection of one of the previews may be detected. A semantic style associated with the selected preview may be applied to a section of the document. The semantic style may be rendered on the selected preview.

The semantic style may also include format attributes of the section of the document. The format attributes of the section may include a font style, a font type, a font color, a font width, an optical style, a line spacing, and/or a background color, among others. A suggestion may also be displayed on the section. The suggestion may identify the section. The suggestion may be formatted based on the semantic style.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a semantic based document editor. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of providing a semantic based document editor, according to embodiments.

In a diagram 100, a computing device 102 may execute a document processing application 108. The computing device 102 may include a tablet device, a laptop computer, a desktop computer, and a smart phone, among others. The computing device 102 may display the document processing application 108 to a user 106. The user 106 may be allowed to interact with the document processing application 108 through an input device or touch enabled display component of the computing device 102. The computing device 102 may include a display device such as the touch enabled display component, and a monitor, among others to provide the document processing application 108 to the user 106.

The document processing application 108 may present previews of a document 110 to the user 106. The previews may be generated based on applied semantic styles. The semantic styles may be identified from previous use or from style resources that provide commonly used semantic styles. In response to a selection of a preview, the document 110 may be generated with sections that are formatted based on a semantic style associated with the preview. In an example scenario, a new document with a title section, a subtitle section, and a paragraph section may be generated based on the selected preview.

Alternatively, the selected preview may be used to format sections of the document 110 with the associated semantic style. In an example scenario, the font size of a title section of the document 110 may be changed based on the semantic style of the selected preview.

The user 106 may interact with the document processing application 108 with a keyboard based input, a mouse based input, a voice based input, a pen based input, and a gesture based input, among others. The gesture based input may include one or more touch based actions such as a touch action, a swipe action, and a combination of each, among others.

The document processing application 108 may store the document 110 locally. Alternatively, the document 110 may be retrieved from a content service hosted by a content server 104. The content server 104 may include a web server, a document server, among others. The computing device 102 may communicate with the content server 104 through a network. The network may provide wired or wireless communications between nodes such as the computing device 102, or the content server 104, among others.

While the example system in FIG. 1 has been described with specific components including the computing device 102, the document processing application 108, embodiments are not limited to these components or system configurations and can be implemented with other system configuration employing fewer or additional components.

Figure 2:
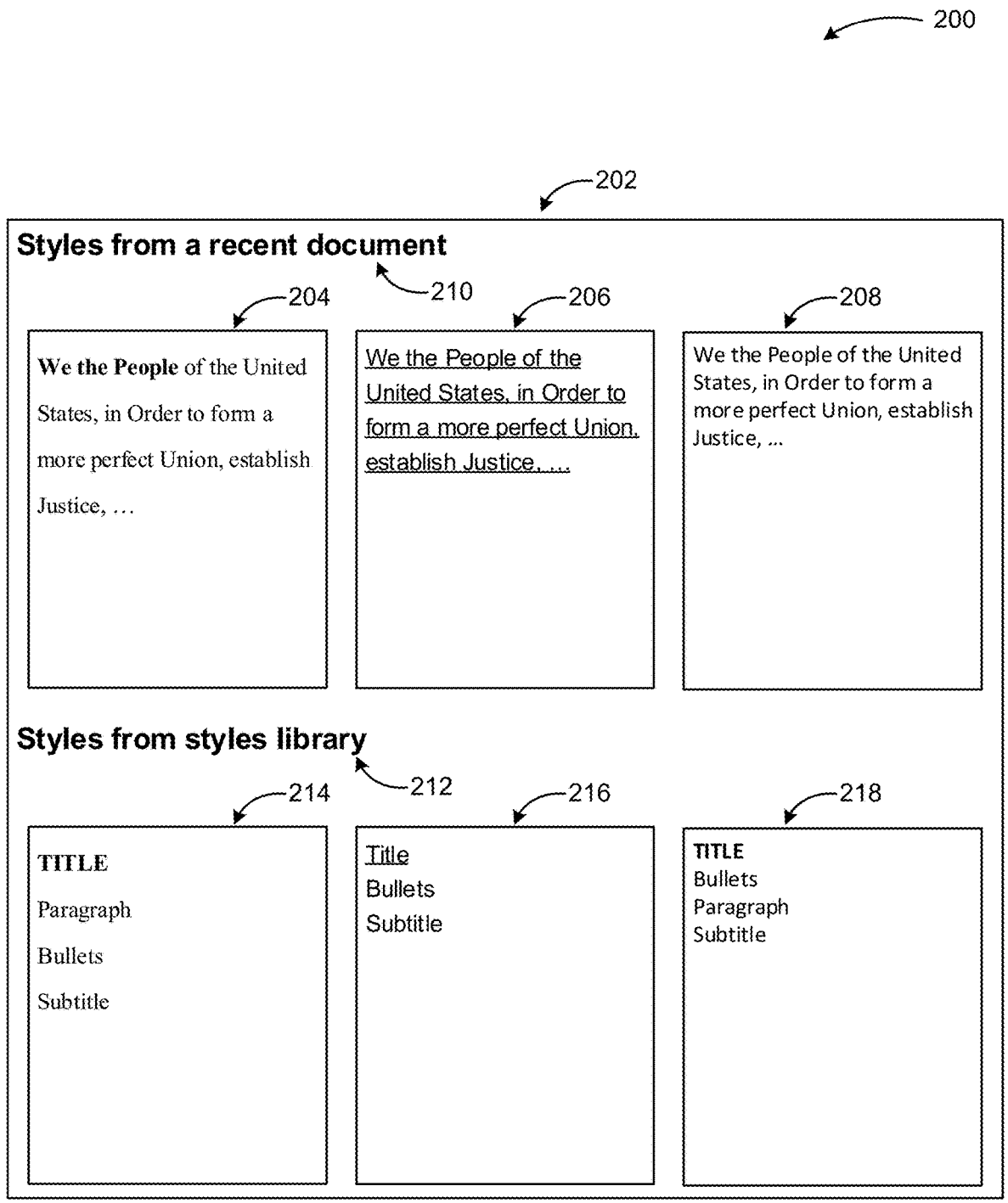
FIG. 2 is a display diagram illustrating an example of a document processing application that provides semantic styles to format a document, according to embodiments.

FIG. 2 is a display diagram illustrating an example of a document processing application that provides semantic styles to format a document, according to embodiments.

In a diagram 200, a document processing application 202 may present previews of a document. For example, a first preview (204), a second preview (206), and a third preview (208) may be displayed, each having a semantic style associated with a recent document 210. The first preview (204), the second preview (206), and the third preview (208) present user-entered content of an existing document formatted using semantic styles from the recent document 210. A fourth preview (214), a fifth preview (216), and a sixth preview (218) may be displayed, each having a semantic style retrieved from a styles library 212.

In an example scenario, in response to a request to generate a new document, previews may be presented with semantic styles to format a document. Recently used semantic styles may be presented through the first preview (204), the second preview (206), and the third preview (208). The recently used semantic styles may be identified from the user's use history associated with previous documents.

A semantic style may classify a section of the new document as a title, a subtitle, a heading, a bullet list, a paragraph a pull quote, a numbered list, and/or a code excerpt, among others. A semantic style may also include format attributes of the section such as a font style, a font type, a font color, a font width, an optical style, a line spacing, and/or a background color, among others. Examples of attributes associated with a section were not provided in a limiting sense. Other attributes may also be applied to a section of a document as described within a semantic style.

Previews may also be generated based on semantic styles retrieved from the styles library 212. The semantic styles associated with the fourth preview (214), the fifth preview (216), and the sixth preview (218) may be retrieved from the styles library 212. The styles library 212 may store semantic style to apply to a document. The styles library 212 may be provided by the document processing application 202. Alternatively, the styles library 212 may be accessed from a trusted external resource provider.

The semantic styles may be retrieved and sorted based on frequency of use, whether by the particular user 106 or a group of users. The previews may be ordered based on a high frequency of use of the associated semantic style to a low frequency of use of the associated semantic style. The previews may also be scrollable to present additional applications of semantic styles through additional previews hidden off screen but accessible through a scroll action.

The fourth preview (214), the fifth preview (216), and the sixth preview (218) may also render sections of the new document with formatting based on the associated semantic style. In an example scenario, the fourth preview (214) may display format attributes to be applied to a title section, a paragraph section, a bullets section, and a subtitle section of a document. The fifth preview (216) may present a different formatting combinations of the sections of the document. The fifth preview (216) may also apply different format attributes to the presented sections.

The previews presented by the document processing application may also be applied to an existing document to format the existing document based on the semantic style associated with a selected preview. The formatting attributes associated with sections (as presented by the selected preview) may be applied to corresponding sections of the existing document. In an example scenario, a selected preview may apply the associated semantic style to the existing document, such as to format the title of the existing document with a bold font.

Figure 3:
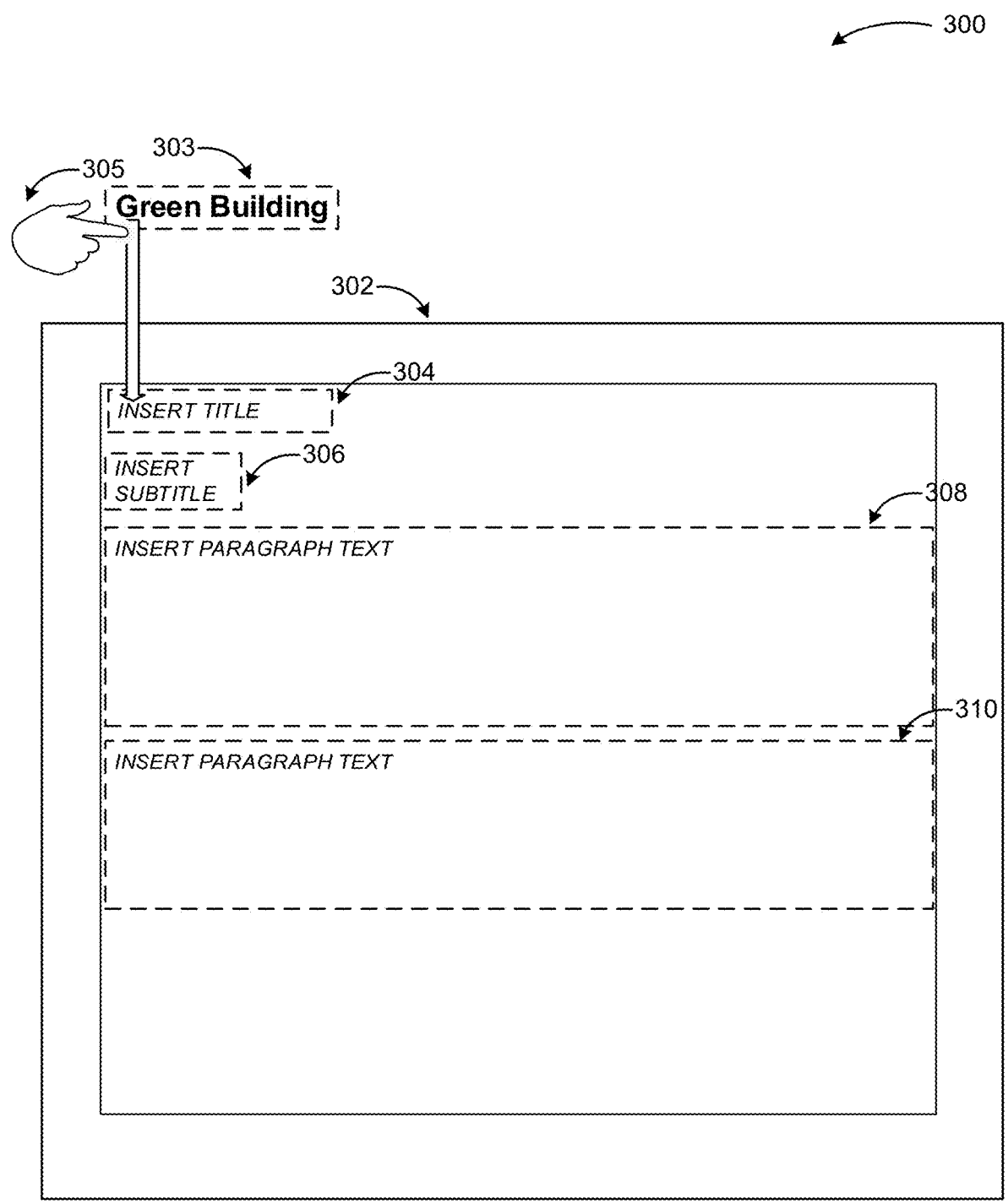
FIG. 3 is a display diagram illustrating an example of a document processing application that provides sections of the document formatted based on a semantic style, according to embodiments.

FIG. 3 is a display diagram illustrating an example of a document processing application that provides sections of the document formatted based on a semantic style, according to embodiments.

In a diagram 300, a document processing application 302 may generate a document with sections formatted based on a selected semantic style. The sections may include requests to prompt a user to enter content associated with the sections. In an example scenario, a title section 304, a subtitle section 306, a paragraph section 308, and a paragraph section 310 may be inserted, along with suggestions that identify the sections within a document. The suggestions may be formatted based on the semantic style applied to the document. The formatted suggestions may inform an editor of the formatting applied to the associated section.

The suggestions may identify the type of the associated section. For example, the suggestion displayed on the title section 304 may request entry of a title into the title section 304. The suggestion displayed on the subtitle section 306 may request entry of a subtitle into the subtitle section 306. The suggestion displayed on the paragraph section 308 may request entry of a paragraph text into the paragraph section 308. Similarly, the suggestion displayed on the paragraph section 310 may request entry of a paragraph text into the paragraph section 310.

A copy action 305 may also be detected to insert a copied content 303 into the title section 304. A source of the copied content 303 may be queried to identify a semantic style associated with the copied content 303. The source may include another document or a content provider, among others. The copied content 303 may be formatted with the semantic style identified at the source of the copied content 303. The copied content 303 (as formatted with the semantic style) may be inserted into the title section 304.

Alternatively, the copied content 303 may be analyzed to classify a semantic style in response to a failure to identify the semantic style of the copied content 303 at the resource. In an example scenario, a short sentence that includes a bold font type formatting may be identified to have a title based semantic style. The copied content 303 may be formatted with the classified semantic style and inserted into the title section 304.

Figure 4:
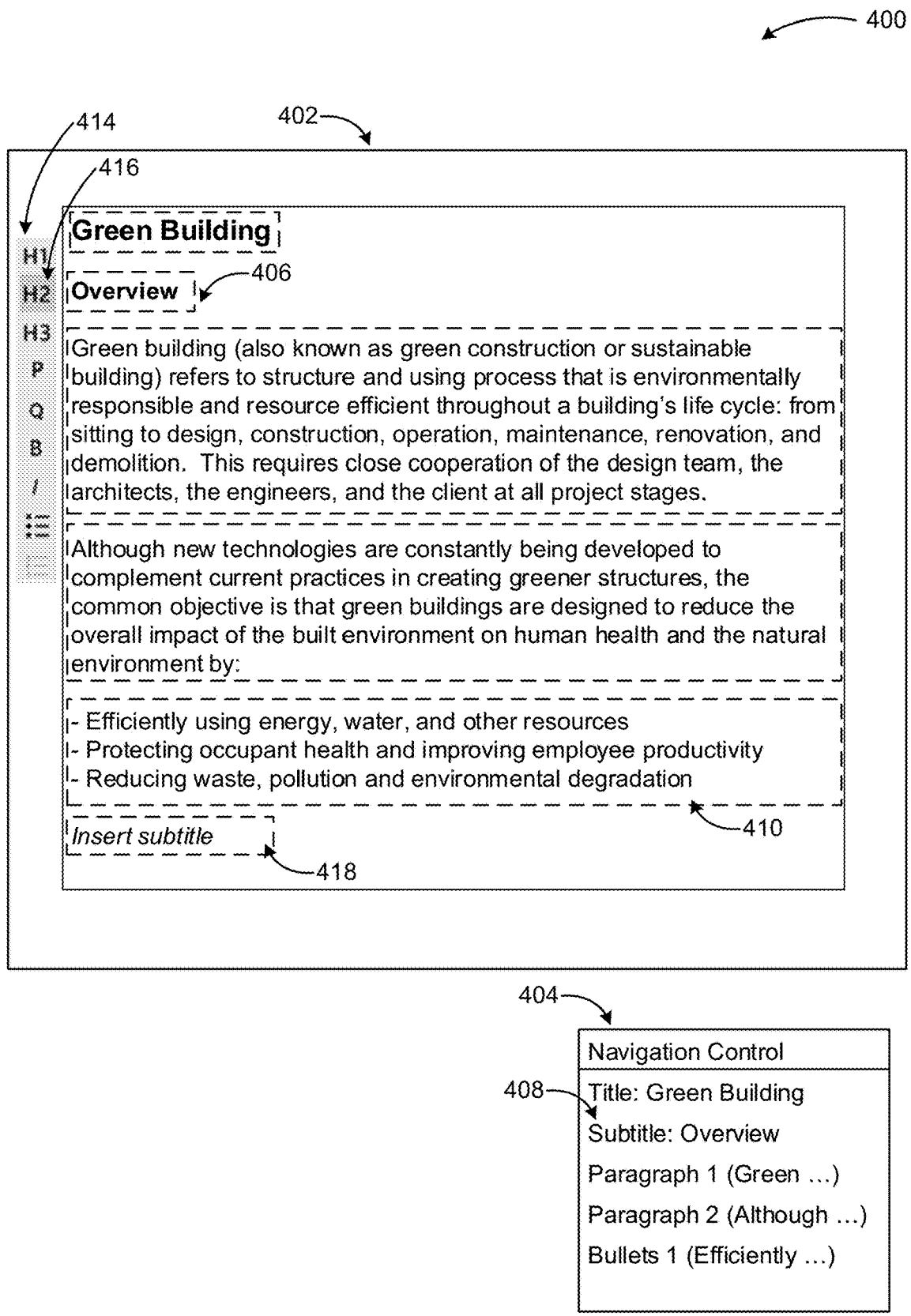
FIG. 4 is a display diagram illustrating a semantic based document editor providing sectioned content formatted based on a semantic style, according to embodiments.

FIG. 4 is a display diagram illustrating a semantic based document editor providing sectioned content formatted based on a semantic style, according to embodiments.

In a diagram 400, a document processing application 402 may display sections of a document formatted based on a semantic style. The semantic style may describe a classification of the section, such as a title and/or a formatting attribute (e.g., font type) of the section, among others.

In response to a selection of a section 406, the document processing application may display a style command control 414 in proximity to the document. The style command control may include style commands to change a semantic style of the section 406. A style command 416 may be highlighted to indicate that a semantic style associated with the style command 416 was used to format the section 406.

The semantic style of the section 406 may be changed in response to a selection of an associated style command on the style command control 414. In an example scenario, a selection of a bullet style command may execute operations to change the semantic style of the section 406 from a subtitle style to a bullet style. As a result, the section 406 may be formatted to include a bulleted item.

The document processing application may also analyze historical data (such as historical use associated with a user, a document, and/or a document type, among others) to identify a subsequent section 418 and format the subsequent section based on a semantic style identified through the historical data and/or heuristics. In an example scenario, the document processing application may analyze document creation patterns, whether of the particular user 106 or a group of users, to identify that a subtitle section follows a bullet section 410 based on past use data associated with the document type and/or a user role, among other attributes. The document processing application may place the subtitle section 418 following the creation of the bullet section 410.

The document processing application may also create a navigation control 404 based on the semantic styles of the sections of the document. The navigation control 404 may have navigation commands linked to the sections of the document. The navigation control 404 may be displayed in proximity to the document. Alternatively, the navigation control 404 may be embedded into the document. An example of the navigation control 404 may include a floating table of contents that may be overlaid on the document. The navigation control 404 may be minimized or hidden based on user preferences. In response to a selection of one of the commands in the navigation control, the document may be scrolled to display a section linked to a navigation command 408.

A section of the document may also be encapsulated with boundaries. The boundaries may be used to indicate a type of content that may be inserted into the section. In an example scenario, a section of the document may be encapsulated with boundaries that are hidden or semi-transparent. In response to a user action to insert a content into the section of the document, the boundaries around the section may be made highlighted and a prompt may be displayed to inform the user that the content may be reformatted to match a semantic style of the section within the boundaries. Alternatively, a prompt may also be displayed to inform the user that a semantic style of the content to be inserted into the section may not match the semantic style of the section. The user may be given a choice to (automatically) reformat the semantic style of the content to match the semantic style of the section or to reject an insertion of the content into the section.

Text and non-text content of sections of the document may be reflowed based on a semantic style applied to the document. In an example scenario, in response to a selection of a semantic style to apply to the document, the text and the non-text (such as images, animations, and similar ones) portions of sections of the document may be reformatted based on the semantic style. The sections may be reflowed to fit the text and the non-text content of the sections to a width associated with the sections. Alternatively, the text and the non-text content may be reflowed to fit a width of a page of the document based on format attributes of the semantic style.

As discussed above, the application may be employed to perform operations associated with providing a semantic based document editor. An increased user efficiency with the document processing application 108 may occur as a result of presenting alternatively formatted sections of a document in various previews. Additionally, the provision of suggestions to enter content associated with a semantic style and other operations of the document processing application 108 may reduce processor load, increase processing speed, conserve memory, and reduce network bandwidth usage.

Embodiments, as described herein, address a need that arises from a lack of efficiency between the user 106 interacting with the document processing application 108 of the computing device 102. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing a semantic based document editor may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
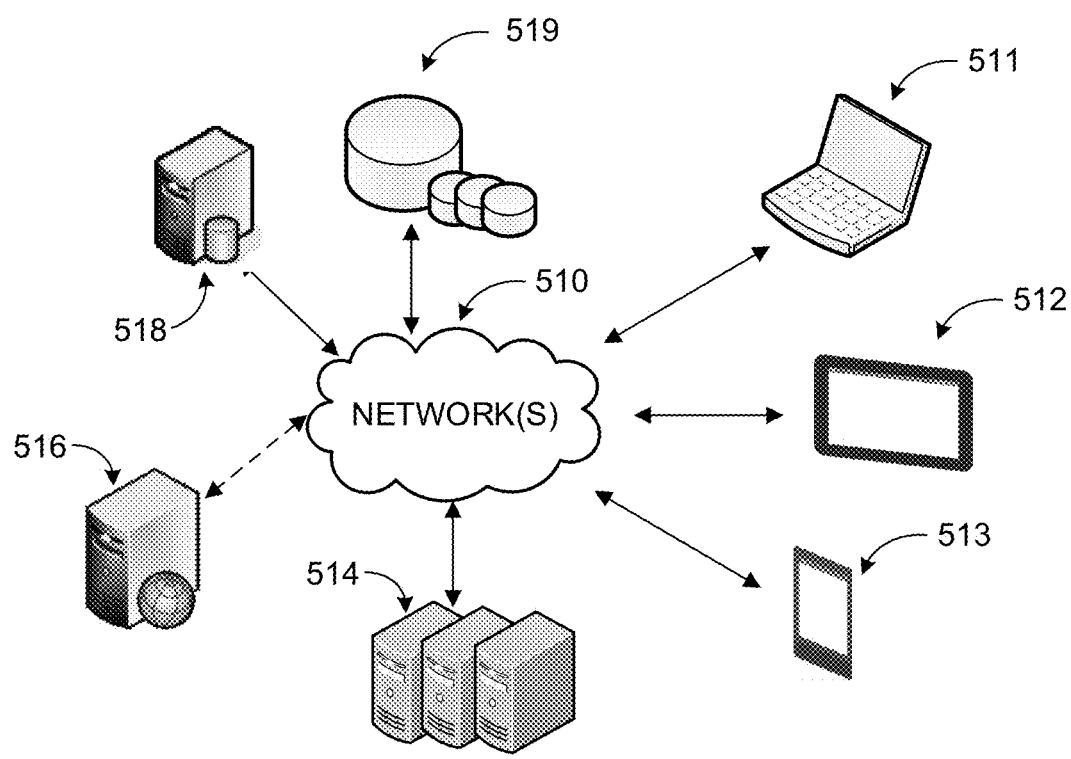
FIG. 5 is a simplified networked environment, where a system according to embodiments may be implemented.

FIG. 5 is an example networked environment, where embodiments may be implemented. A document processing application configured to provide a semantic based document editor may be implemented via software executed over one or more servers 514 such as a hosted service. The platform may communicate with client applications on individual computing devices such as a smart phone 513, a mobile computer 512, or desktop computer 511 (client devices') through network(s) 510.

Client applications executed on any of the client devices 511-513 may facilitate communications via application(s) executed by servers 514, or on individual server 516. A document processing application may display previews of a document. The previews may include semantic styles. In response to a selection of one of the previews, a semantic style associated with the selected preview may be applied to a section of the document. The semantic style may be rendered on the selected preview. A suggestion may be displayed on the section. The suggestion may identify the section. The document processing application may store data associated with the document in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide a semantic based document editor. Furthermore, the networked environments discussed in FIG. 5 are for illustration purposes only. Embodiments are not limited to the example applications, modules, or processes.

Figure 6:
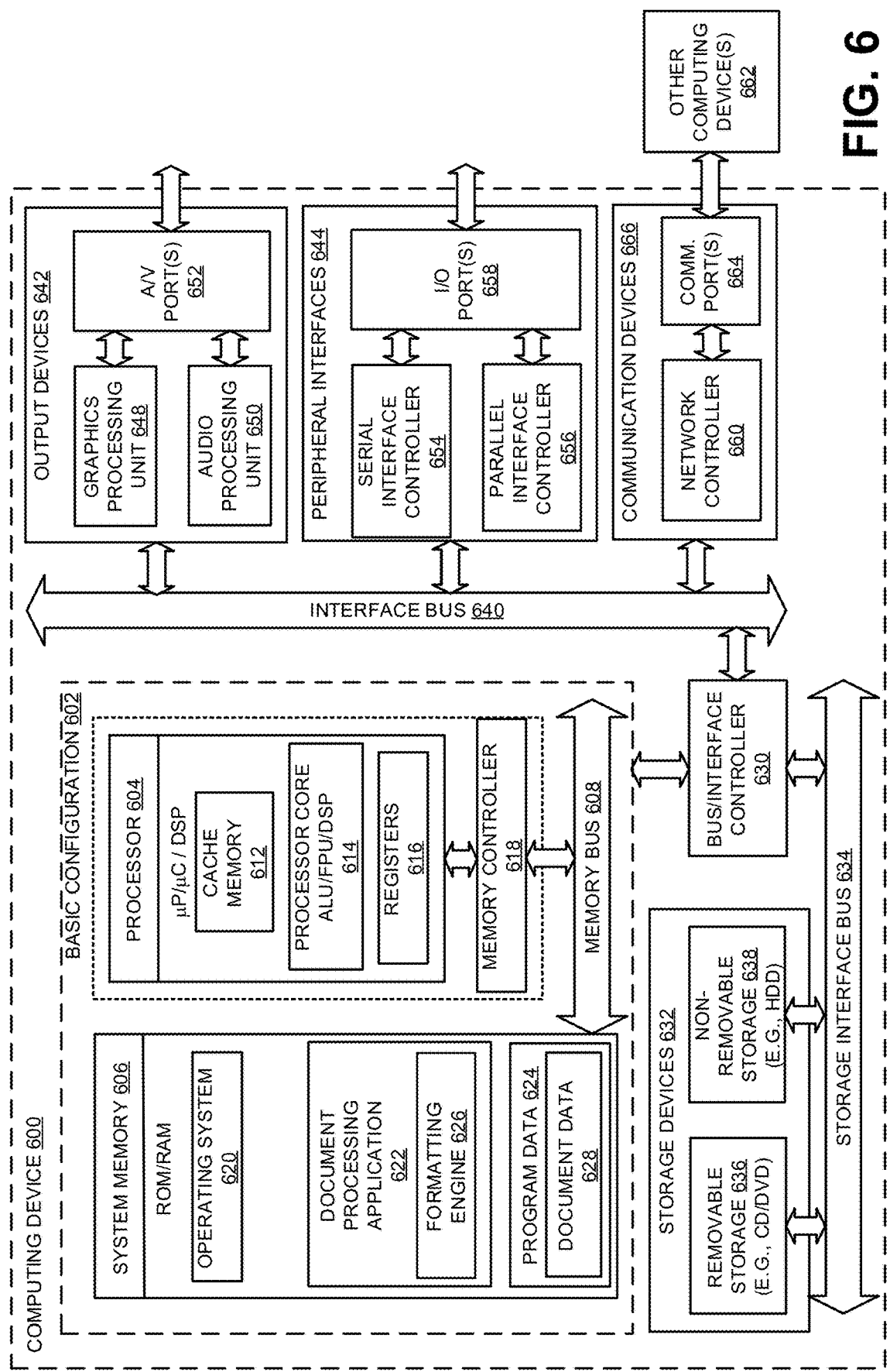
FIG. 6 is a block diagram of an example computing device, which may be used to provide a semantic based document editor.

FIG. 6 is a block diagram of an example computing device, which may be used to provide a semantic based document editor.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a document processing application 622, and a program data 624. The document processing application 622 may include a component such as a formatting engine 626. The formatting engine 626 may execute the processes associated with the document processing application 622. The formatting engine 626 may display previews of a document. The previews may include semantic styles. In response to a selection of one of the previews, a semantic style associated with the selected preview may be applied to a section of the document. The semantic style may be rendered on the selected preview. A suggestion may be displayed on the section. The suggestion may identify the section.

Components of the document processing application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the document processing application 622, displayed by the touch based device. The program data 624 may also include, among other data, document data 628, or the like, as described herein. The document data 628 may include a semantic style applied to a document, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide a semantic based document editor. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
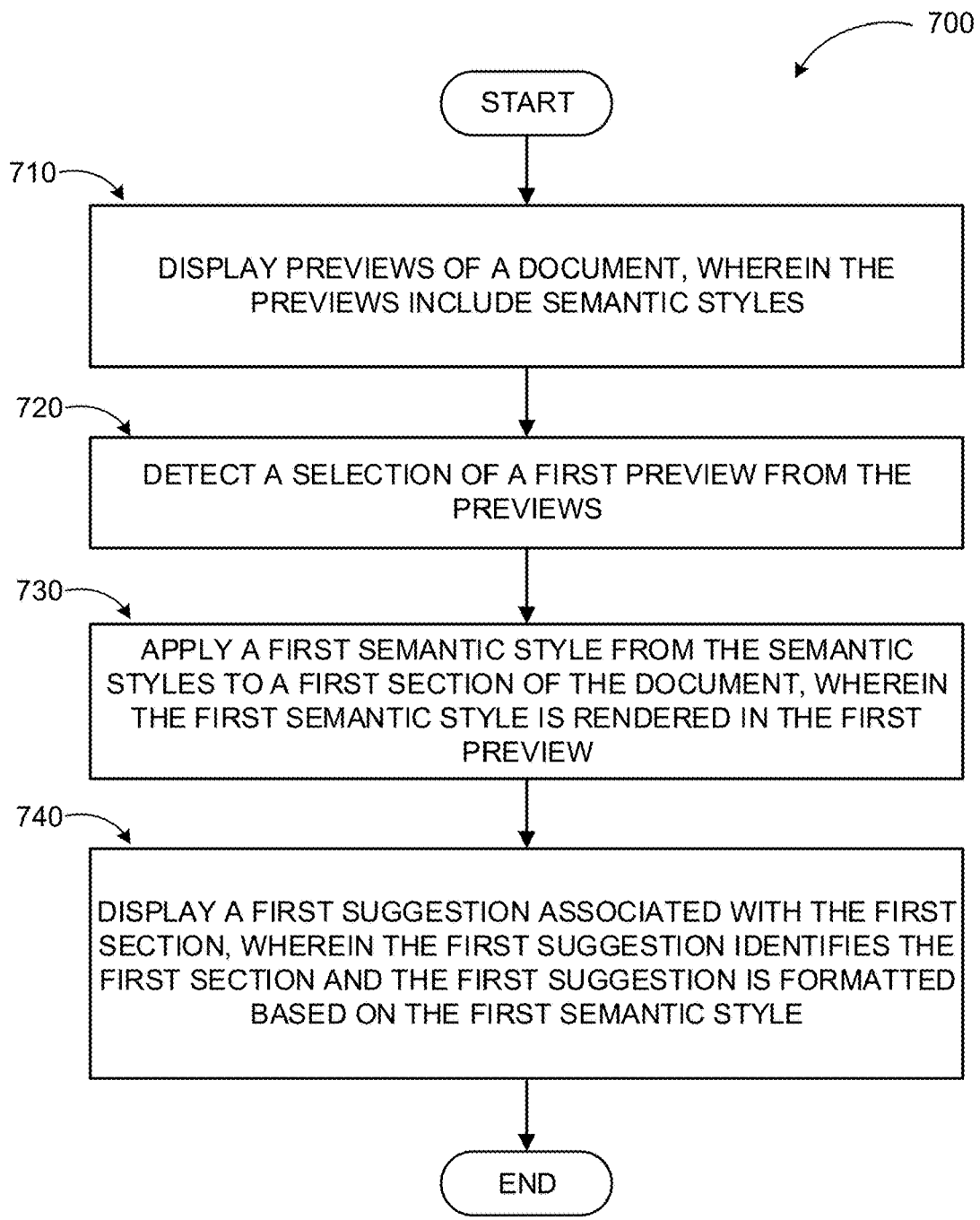
FIG. 7 is a logic flow diagram illustrating a process to provide a semantic based document editor, according to embodiments.

FIG. 7 is a logic flow diagram illustrating a process for providing a semantic based document editor, according to embodiments. Process 700 may be implemented on a computing device, such as the computing device 600 or another system.

Process 700 begins with operation 710, where previews of a document may be displayed. The previews may include semantic styles. The semantic styles may include a classification of a section of the document such as a title classification or a formatting attribute to apply to the section such as a font type attribute. At operation 720, a selection of a preview may be detected At operation 730, a semantic style associated with the selected preview may be applied to the section of the document. The semantic style may be rendered in the selected preview. At operation 740, a suggestion may be displayed on the section. The suggestion may identify the section. The suggestion may also be formatted based on the semantic style.

The operations included in process 700 are for illustration purposes. Providing a semantic based document editor may be implemented by similar processes with fewer or additional steps, as well as in different order of operations using the principles described herein.

According to some examples, a computing device to provide a semantic based document editor may be described. The computing device may include a display device, a memory configured to store instructions associated with a document processing application and one or more processors coupled to the memory and the display device. The one or more processors may execute the document processing application in conjunction with the instructions stored in the memory. The document processing application may include a formatting engine configured to display previews of a document on the display device, where the previews include semantic styles, detect a selection of a first preview from the previews, apply a first semantic style from the semantic styles to a first section of the document, where the first semantic style is rendered in the first preview, and display, on the display device, a first suggestion associated with the first section, where the first suggestion identifies the first section and the first suggestion is formatted based on the first semantic style.

According to some examples, the first semantic style may include a classification of the first section into one or more of: a title, a subtitle, a heading, a bullet list, a paragraph, a pull quote, a numbered list, and a code excerpt style. The first semantic style may also include includes one or more format attributes associated with the first section and the one or more format attributes may include one or more of: a font style, a font type, a font color, a font width, an optical style, a line spacing, and a background color.

According to other examples, the formatting engine is further configured to detect entry of a new content into a location on the document outside of the first section, identify a second semantic style associated with the new content, and create a second section of the document, where the second section is formatted based on the second semantic style. The new content is formatted based on the second semantic style and the new content is inserted into the second section. The new content is matched to a previous content based on a comparison and a previously used semantic style of the previous content is identified as the second semantic style to associate with the new content.

According to further examples, the formatting engine is further configured to detect entry of a new content into a location on the document outside of the first section, in response to a failure to identify a second semantic style associated with the new content, prompt for an input to identify the second semantic style to associate with the new content, receive an input that identifies the second semantic style associated with the new content, create a second section of the document, where the second section is formatted based on the second semantic style, format the new content based on the second semantic style, and insert the new content into the second section.

According to other examples, the formatting engine is further configured to detect a copy action to insert a copied content into a location outside of the first section and query a resource of the copied content to identify a second semantic style of the copied content at the resource. The second semantic style of the copied content is identified from the resource, a second section formatted is created with the second semantic style, and the copied content is inserted into the second section, where the copied content is formatted with the second semantic style. The formatting engine is further configured to in response to a failure to identify the second semantic style from the resource, analyze the copied content to match the copied content to an associated semantic style, create a second section formatted with the associated semantic style, and insert the copied content into the second section, where the copied content is formatted with the associated semantic style.

According to some examples, a method provide a semantic based document editor may be described. The method may include displaying previews of a document, where the previews include semantic styles, detecting a selection of a first preview from the previews, applying a first semantic style from the semantic styles to a first section of the document, where the first semantic style is rendered in the first preview and the first semantic style includes a classification of the first section into one or more of: a title, a subtitle, a bullet list, a paragraph, a pull quote, a numbered list, and a code excerpt, and displaying a first suggestion associated with the first section, where the first suggestion identifies the first section and the first suggestion is formatted based on the first semantic style.

According to other examples, the method may further include detecting a selection of the first section on the document, displaying a command control adjacent to the first section, where the command control includes style commands, highlighting a first style command from the style commands, where the first style command includes operations to apply the first semantic style to the first section, detecting a selection of a second style command from the style commands, and formatting the first section with a second semantic style associated with the second style command.

According to further examples, the method may further include displaying the first suggestion on the first section, where the first suggestion includes a type of the first semantic style applied on the first section. The method may further include generating a navigation control that includes a first navigation command linked to the first section, where the navigation command includes a first label associated with the first section, displaying the navigation control in proximity to the document, detecting a selection of the first navigation command, and scrolling through the document to display the first section.

According to some examples, a computer-readable memory device with instructions stored thereon to provide a semantic based document editor may be described. The instructions may include actions that are similar to the method described above.

According to some examples a means to provide a semantic based document editor may be described. The means to provide a semantic based document editor may include a means to display previews of a document, where the previews include semantic styles, a means to detect a selection of a first preview from the previews, a means to apply a first semantic style from the semantic styles to a first section of the document, where the first semantic style is rendered in the first preview, and a means to display a first suggestion on the first section, where the first suggestion identifies the first section and the first suggestion is formatted based on the first semantic style.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide a semantic based document editor in conjunction with a document processing application, the computing device comprising:
a memory configured to store instructions associated with the semantic based document editor;
one or more processors coupled to the memory, the one or more processors configured to:
in response to a request, retrieve a plurality of suggested semantic styles based upon commonly used semantic styles, each suggested semantic style including a classification of multiple sections and format attributes associated with the multiple sections;
sort the plurality of suggested semantic styles based on frequency of use by a particular user;
provide to be displayed, on a display device, a plurality of previews representing the sorted plurality of suggested semantic styles, the plurality of previews including user-entered contents of an existing document having the multiple sections, the plurality of previews showing the user-entered contents having the format attributes associated with the plurality of suggested semantic styles, wherein the plurality of previews are sorted based on a high frequency of use of an associated semantic style to a low frequency of use of another associated semantic style;
detect a selection of a selected semantic style among the plurality of suggested semantic styles by the particular user; and
apply the selected semantic style to the existing document by formatting the multiple sections based on the selected semantic style.

2. The computing device of claim 1, wherein the format attributes include one or more of: a font style, a font type, a font color, a font width, an optical style, a line spacing, or a background color.

3. The computing device of claim 1, wherein the one or more processors are further configured to:
detect entry of a new content into a location on the document outside of the multiple sections;
identify another semantic style associated with the new content; and
create another section of the document formatted based on the other semantic style.

4. The computing device of claim 1, wherein the one or more processors are further configured to:
detect entry of a new content into a location on the document within a particular section; and
in response to a failure to match another semantic style associated with the new content to the semantic style of the particular section, provide a prompt for an input to be displayed to select between an automatic reformatting of the other semantic style associated with the new content to match the semantic style of the particular section and a rejection of the entry of the new content into the particular section.

5. The computing device of claim 1, wherein the one or more processors are further configured to:
detect a copy action to insert a copied content into a location outside of the multiple sections; and
query a resource of the copied content to identify another semantic style of the copied content at the resource.

6. The computing device of claim 5, wherein the one or more processors are further configured to:
identify the other semantic style of the copied content from the resource;
create another section formatted with the other semantic style; and
insert the copied content into the other section, wherein the copied content is formatted with the other semantic style.

7. The computing device of claim 1, wherein the one or more processors are further configured to:
detect entry of a new content into a location on the document within a subsequent section;
analyze historical data associated with the particular user or the document to identify a semantic style for the subsequent section; and
format the subsequent section based on the identified semantic style.

8. A method executed on a computing device to provide a semantic based document editor, the method comprising:
in response to a request, retrieving a plurality of suggested semantic styles based on commonly used semantic styles;
sorting the plurality of suggested semantic styles based on frequency of use by a particular user;
providing to be displayed, on a display device, a plurality of previews representing the sorted plurality of suggested semantic styles, the plurality of previews including user-entered contents of multiple sections of a document, the plurality of previews showing the user-entered contents having format attributes associated with the plurality of suggested semantic styles, wherein the plurality of previews are sorted based on a high frequency of use of an associated semantic style to a low frequency of use of another associated semantic style;
detecting a selection of a selected semantic style among the plurality of suggested semantic styles; and
applying the selected semantic style to the document by formatting the multiple sections based on the selected semantic style.

9. The method of claim 8, wherein the format attributes include one or more of: a font style, a font type, a font color, a font width, an optical style, a line spacing, or a background color.

10. The method of claim 8, further comprising:
detecting entry of a new content into a location on the document outside of the multiple sections;
identifying another semantic style associated with the new content; and
creating another section of the document formatted based on the other semantic style.

11. The method of claim 8, further comprising:
detecting entry of a new content into a location on the document within a particular section; and
in response to a failure to match another semantic style associated with the new content to the semantic style of the particular section, providing a prompt for an input to be displayed to select between an automatic reformatting of the other semantic style associated with the new content to match the semantic style of the particular section and a rejection of the entry of the new content into the particular section.

12. The method of claim 8, further comprising:
detecting a copy action to insert a copied content into a location outside of the multiple sections; and
querying a resource of the copied content to identify another semantic style of the copied content at the resource.

13. The method of claim 12, further comprising:
identifying the other semantic style of the copied content from the resource;
creating another section formatted with the other semantic style; and
inserting the copied content into the other section, wherein the copied content is formatted with the other semantic style.

14. The method of claim 8, further comprising:
detecting entry of a new content into a location on the document within a subsequent section;
analyzing historical data associated with the particular user or the document to identify a semantic style for the subsequent section; and
formatting the subsequent section based on the identified semantic style.

15. A computer-readable memory device with instructions stored thereon to provide a semantic based document editor, the instructions comprising:
in response to a request, retrieving a plurality of suggested semantic styles based on commonly used semantic styles;
sorting the plurality of suggested semantic styles based on frequency of use by a particular user;
providing to be displayed, on a display device, a plurality of previews representing the sorted plurality of suggested semantic styles, the plurality of previews including user-entered contents of multiple sections of a document, the plurality of previews showing the user-entered contents having format attributes associated with the plurality of suggested semantic styles, wherein the plurality of previews are sorted based on a high frequency of use of an associated semantic style to a low frequency of use of another associated semantic style;
detecting a selection of a selected semantic style among the plurality of suggested semantic styles; and
applying the selected semantic style to the document by formatting the multiple sections based on the selected semantic style, which includes format attributes associated with the multiple sections.

16. The computer-readable memory device of claim 15, wherein the instructions further comprise:
detecting entry of a new content into a location on the document outside of the multiple sections;
identifying another semantic style associated with the new content; and
creating another section of the document formatted based on the other semantic style.

17. The computer-readable memory device of claim 15, wherein the instructions further comprise:
detecting entry of a new content into a location on the document within a particular section; and
in response to a failure to match another semantic style associated with the new content to the semantic style of the particular section, providing a prompt for an input to be displayed to select between an automatic reformatting of the other semantic style associated with the new content to match the semantic style of the particular section and a rejection of the entry of the new content into the particular section.

18. The computer-readable memory device of claim 15, wherein the instructions further comprise:
detecting a copy action to insert a copied content into a location outside of the multiple sections; and
querying a resource of the copied content to identify another semantic style of the copied content at the resource.

19. The computer-readable memory device of claim 18, wherein the instructions further comprise:
identifying the other semantic style of the copied content from the resource;
creating another section formatted with the other semantic style; and
inserting the copied content into the other section, wherein the copied content is formatted with the other semantic style.

20. The computer-readable memory device of claim 15, wherein the instructions further comprise:
detecting entry of a new content into a location on the document within a subsequent section;
analyzing historical data associated with the particular user or the document to identify a semantic style for the subsequent section; and
formatting the subsequent section based on the identified semantic style.

\* \* \* \* \*